R. W. WHITNEY.
Clutches for Sewing-Machine Wheels and Pulleys.

No. 157,731.        Patented Dec. 15, 1874.

Witness.       Inventor.

UNITED STATES PATENT OFFICE.

RUEL W. WHITNEY, OF CLEVELAND, OHIO, ASSIGNOR TO WILSON SEWING-MACHINE COMPANY, OF SAME PLACE.

IMPROVEMENT IN CLUTCHES FOR SEWING-MACHINE WEEELS AND PULLEYS.

Specification forming part of Letters Patent No. 157,731, dated December 15, 1874; application filed November 2, 1874.

*To all whom it may concern:*

Be it known that I, RUEL W. WHITNEY, of Cleveland, in the county of Cuyahoga and State of Ohio, have invented an Improved Clutch for Sewing-Machine Wheel and Pulley, of which the following is a specification:

This invention relates to a device for locking the fly-wheel and pulley when revolving in one direction for turning the shaft, but which runs loose on the shaft when revolving in the opposite direction, the object being to prevent the machine from being run backward. It consists of a pawl attached to the shaft in such a manner that, when the wheel runs in one direction, the end of the pawl bears against the rim of the wheel, locking it to the shaft, so that both revolve together.

To enable others to fully understand my invention, I will proceed to describe the same in detail by the aid of the accompanying drawing, in which—

Figure 1:
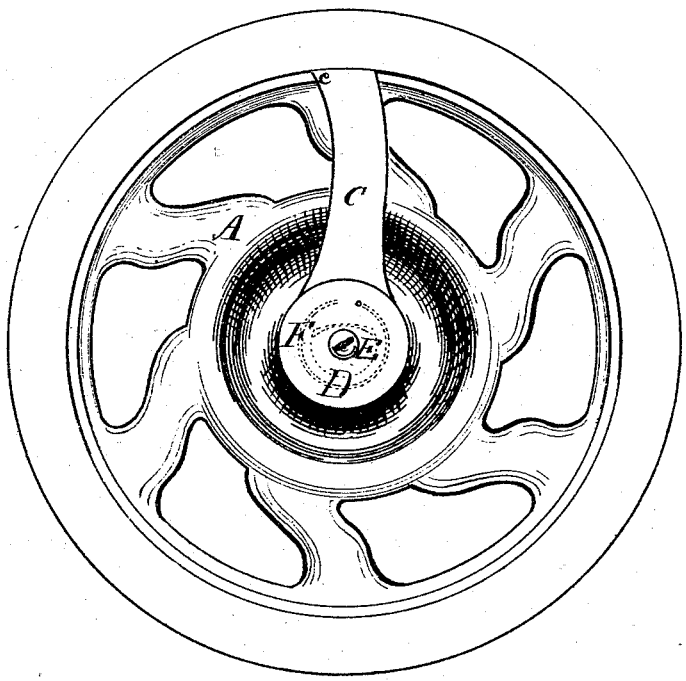
Figure 2:
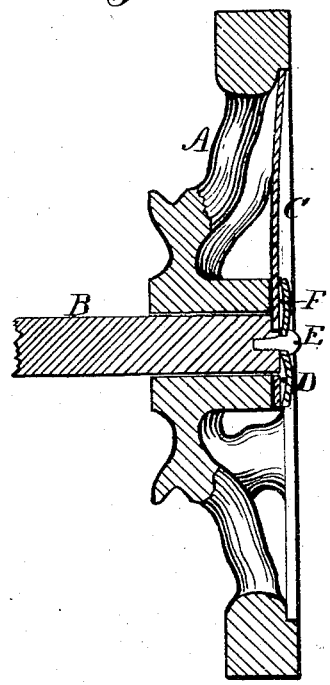

Figure 1 is a front elevation of a wheel and pulley having my improvement attached. Fig. 2 is a vertical section of the same in line $x$ $x$ of Fig. 1.

A represents the fly-wheel and pulley of a sewing-machine, and B the shaft. The wheel is not keyed to the shaft, but is allowed to run loosely on it. To lock the said wheel to the shaft I employ a pawl, C, which is placed on the end of the shaft B, just outside of the hub, the outer end of said pawl lying in an annular rabbet cut in the inner edge of the rim of the wheel. The pawl C has a half-round hole in the end attached to the shaft, which fits over a corresponding projection on the end of the shaft, and has a little play thereon to the right and left. The pawl C is secured to the shaft by a cap, D, which is secured by a screw, E, in the end of the shaft. The said cap D is made with a circular recess on the inside face, in which lies a small spring, F, one end of said spring being secured to the cap D, and the other end to the pawl C, the object of which is to hold the longer point $c$ of the pawl in contact with the rim of the wheel, so as to insure its catching when the wheel revolves to the right. The pawl thus acts as a clutch to cause the shaft B to revolve with the wheel.

With this arrangement of the fly-wheel and pulley, the bobbin-winder, being operated by the backward or independent revolutions of the wheel, is performed without disturbing or removing the work from the needle.

Having described my invention, I claim—

The pawl C, the cap D, the screw E, and the spring F, or their equivalents, in combination with the wheel A and shaft B, substantially as and for the purpose set forth.

R. W. WHITNEY.

Witnesses:
A. ZEHRING,
GEO. W. TIBBITTS.